United States Patent
Du et al.

(10) Patent No.: US 8,285,689 B2
(45) Date of Patent: Oct. 9, 2012

(54) DISTRIBUTED FILE SYSTEM AND DATA BLOCK CONSISTENCY MANAGING METHOD THEREOF

(75) Inventors: Shoufu Du, Shenzhen (CN); Ruifeng Wang, Shenzhen (CN); Jian Cheng, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/057,187

(22) PCT Filed: Jul. 30, 2009

(86) PCT No.: PCT/CN2009/000855
§ 371 (c)(1),
(2), (4) Date: Mar. 17, 2011

(87) PCT Pub. No.: WO2010/015143
PCT Pub. Date: Feb. 11, 2010

(65) Prior Publication Data
US 2011/0161302 A1 Jun. 30, 2011

(30) Foreign Application Priority Data
Aug. 4, 2008 (CN) .......................... 2008 1 0142291

(51) Int. Cl.
*G06F 17/30* (2006.01)
(52) U.S. Cl. ........ 707/687; 707/690; 707/698; 707/704; 709/212; 709/219; 709/230
(58) Field of Classification Search .......... 707/687–690, 707/698; 709/212, 219, 230, 233
See application file for complete search history.

(56) References Cited

U.S. PATENT DOCUMENTS

| | | | | |
|---|---|---|---|---|
| 5,634,096 A | * | 5/1997 | Baylor et al. | 714/6.24 |
| 6,052,797 A | * | 4/2000 | Ofek et al. | 714/6.23 |
| 6,256,642 B1 | * | 7/2001 | Krueger et al. | 1/1 |
| 6,643,672 B1 | | 11/2003 | Lebel | |
| 7,055,059 B2 | * | 5/2006 | Yanai et al. | 714/6.32 |
| 7,065,618 B1 | | 6/2006 | Ghemawat et al. | |

(Continued)

FOREIGN PATENT DOCUMENTS
CN 101334797 A 12/2008

OTHER PUBLICATIONS

D. Stott Parker, Jr. et al. "Detection of Mutual Inconsistency in Distributed Systems." IEEE Transactions on Software Engineering, vol. SE-9, No. 3, May 1983.

*Primary Examiner* — Hanh Thai
(74) *Attorney, Agent, or Firm* — James W. Kayden

(57) ABSTRACT

A distributed file system and a data block consistency managing method thereof are disclosed. The method comprises: a file location register generates the values of the counters corresponding to CHUNKs and the values of the counters are simultaneously stored in file access servers and a file location register; when writing data into a CHUNK, a file access client writes data into both the main and standby file access servers and revises the values of counters of CHUNKs in the file access servers into which data is written normally; the file location register takes the CHUNK whose counter has the maximal value as the normal and valid one according to the corresponding values of the counters of corresponding CHUNK reported by the main and standby file access servers.

11 Claims, 2 Drawing Sheets

U.S. PATENT DOCUMENTS

| | | | |
|---|---|---|---|
| 7,647,329 B1 * | 1/2010 | Fischman et al. | 707/999.1 |
| 7,739,239 B1 * | 6/2010 | Cormie et al. | 707/626 |
| 7,778,972 B1 * | 8/2010 | Cormie et al. | 707/626 |
| 2001/0034809 A1 * | 10/2001 | Ogawa | 711/103 |
| 2002/0010797 A1 * | 1/2002 | Moulton | 709/247 |
| 2006/0020474 A1 * | 1/2006 | Stewart et al. | 704/500 |
| 2007/0156842 A1 * | 7/2007 | Vermeulen et al. | 709/217 |
| 2008/0140909 A1 * | 6/2008 | Flynn et al. | 711/100 |
| 2008/0140910 A1 * | 6/2008 | Flynn et al. | 711/100 |
| 2008/0168304 A1 * | 7/2008 | Flynn et al. | 714/7 |
| 2008/0183882 A1 * | 7/2008 | Flynn et al. | 709/229 |
| 2008/0183953 A1 * | 7/2008 | Flynn et al. | 711/103 |
| 2008/0208601 A1 * | 8/2008 | Stewart et al. | 704/500 |
| 2008/0229003 A1 * | 9/2008 | Mizushima et al. | 711/103 |
| 2008/0256183 A1 * | 10/2008 | Flynn et al. | 709/204 |
| 2008/0256292 A1 * | 10/2008 | Flynn et al. | 711/114 |
| 2008/0301256 A1 * | 12/2008 | McWilliams et al. | 709/214 |
| 2008/0313364 A1 * | 12/2008 | Flynn et al. | 710/31 |
| 2009/0019087 A1 * | 1/2009 | Stewart et al. | 707/104.1 |
| 2009/0132760 A1 * | 5/2009 | Flynn et al. | 711/113 |

* cited by examiner

DISTRIBUTED FILE SYSTEM AND DATA BLOCK CONSISTENCY MANAGING METHOD THEREOF

CROSS REFERENCE RELATED APPLICATIONS

This application is a national phase of PCT/CN2009/000855 filed Jul. 30, 2009 which claims priority to China Application Serial No. 200810142291.2, filed Aug. 4, 2008, both of which are entirely incorporated herein by reference.

TECHNICAL FIELD

The present invention relates to the large capacity storage distributed file system and the managing method for the same in the field of computer applications, and more especially, to a file system for large scale distributed data processing and the method thereof for redundant backup data block consistency check and backup management.

BACKGROUND OF THE RELATED ART

In the prior art, in order to guarantee the high efficiency of data processing and the centralized management of the metadata, the large scale distributed data processing file system is generally designed as a metadata centralized management server (such as the file location register (FLR)), and a plurality of data file storage server (such as the File Access Server (FAS)).

When a user accesses the data, he/she firstly inquires of the FLR the specific storage location of the data via the file access client (FAC), and then the FAC initiates a read-write data request to the specific FAS. The way that the FAS manages the data file is to divide the file data into individual CHUNKs, and each file consists of a plurality of CHUNKs. The way of the CHUNK matching to the file is identified by a uniform identifier FILEID, and each file has a FILEID different from other files, and the CHUNKID of each CHUNK is FILEID+CHUNK number. The distribution information of all CHUNKs in a file is uniformly put in the database and managed by the FLR.

In a large capacity cluster system, generally the CHUNKs are redundantly backed up, that is, the copies of the same CHUNK are stored in a plurality of FASs. However, it is hard to maintain the consistency of several copies of a CHUNCK in the prior art, which is a relatively big problem, mainly represented in the following conditions: in the process of writing operation, how to guarantee simultaneously writing the corresponding copies in a plurality of FASs; if there is one FAS abnormal or broken, how to reconstruct the data in this FAS; during the writing process, how to guarantee the consistency of FLR record and FAS if the FLR is abnormal.

Since it relates to massive CHUNKs, general check method such as MD5 cannot be applied to the CHUNKs in the prior art because this will severely affect the processing performance.

Therefore, the prior art should be improved and developed.

CONTENT OF THE INVENTION

The purpose of the present invention is to provide a distributed file system and CHUNK consistency managing method in order to solve the above problems in the prior art and implement the check and necessary reconstruction for the CHUNKs of the massive data.

The technical scheme of the present invention comprises:
A CHUNK consistency managing method in a distributed file system, and said method comprises the following steps of:

A. when generating a CHUNK, a file location register generating a counter value corresponding to the generated CHUNK and storing the counter value in both file access servers and the file location register;

B. when writing data into a CHUNK, a file access client writing the data into a main and standby file access servers, and if the data is successfully written into both the main and standby file access servers, the file access client doing not to revise the counter value of the CHUNK; otherwise, the file access client increasing the counter value of the CHUNK in the file access servers into which the data is written successfully with a predetermined step length;

C. said file location register, based on the counter values of the corresponding CHUNK reported by the main and standby file access servers, taking the CHUNK whose counter value is maximal as normal and valid CHUNK, and reconstructing the abnormal CHUNKs.

Furthermore, the method further comprises:
when revising data of the CHUNK, said file location register returning to said file access client information of the main and standby file access servers in which the CHUNK locates, and said file access client initiating a data revision operation for said main and standby file access servers;

if the data is revised successfully in both said main and standby file access servers, the file access client does not revise the counter value of the CHUNK; otherwise the file access client increasing with the predetermined step length the counter value of the revised CHUNK in the file access server in which the data is revised successfully.

Furthermore, in the method, said predetermined step length is 1.

Furthermore, in the method, said step C further comprises: said file location register sends a CHUNK check request to said file access servers at a start-up time point and at a certain time interval.

Furthermore, in the method, said method further comprises a CHUNK check process, wherein the CHUNK check process comprises:

D1. said file access servers reporting all local CHUNKIDs to the file location register, and said file location register making a HASH table with the CHUNKIDs received firstly, and for a CHUNKID received subsequently, searching in the HASH table for a CHUNKID matched with the CHUNKID received subsequently, and if there is a CHUNKID matched with the CHUNKID received subsequently in the HASH table, it means the CHUNKs are a group of main and standby CHUNKs;

D2. the file location register recording all groups of CHUNKIDs, and checking each CHUNK.

Furthermore, in the method, said file location register takes the main and standby file access servers storing copies of the same CHUNK as one group and divides all file access servers in the system into a plurality of groups.

Furthermore, in the method, said step of checking the CHUNKs corresponding to each group of CHUNKIDs in step D2 comprises:

D21. checking whether the CHUNKs have record in said file location register; and directly deleting the CHUNKs from the file access servers if no; otherwise proceeding to step D22;

D22. comparing the counter values of the corresponding CHUNKs in said file location register database and each file access server, and taking the CHUNK with the maximum counter value as a valid CHUNK.

Furthermore, in the method, the step D2 further comprises:

if the counter value of the CHUNK in said file location register is maximal, a record of the CHUNK in a database of said file location register is deleted.

Furthermore, in the method, the step D2 further comprises:

if there is a file access server in which the counter value of the CHUNK is maximal, said file location register sends a CHUNK reconstruction request to other file access servers in which the counter value of the CHUNK is relatively small and copies the valid CHUNK to the abnormal CHUNK;

after data is copied, the counter value of the CHUNK in each file access server is revised to make the counter value consistent with the maximum counter value.

Furthermore, in the method, the step D2 further comprises:

if the counter value of the CHUNK in said file location register is smaller than that in said file access servers, a counter value of the CHUNK in said database of the file location register database is revised synchronously.

A distributed file system, comprising at least one file access server and at least one file location register connected together through a network; said file access server connecting to a data storage; a user sending a data writing request to said file access server and said file location register via a file access client and increasing counter value of the CHUNK in the file server into which data is written normally with a predetermined step length; wherein, said file access server is configured with at least a main and standby file access servers; and said file location register is used to generate the counter value corresponding to the CHUNK, and control reconstruction for abnormal CHUNKs according to the counter value of the CHUNK reported by the main and standby file access servers.

Since CHUNK counter is applied in the distributed file system and a CHUNK consistency managing method provided in the present invention to record whether each CHUNK is abnormal or not and whether each CHUNK needs to be reconstructed or not, it can easily and efficiently manage the redundant standby CHUNKs in the massive cluster system and sustain its consistency, moreover, it can reconstruct abnormal standby CHUNK, and the implementation is simple and accurate.

PREFERRED EMBODIMENTS OF THE PRESENT INVENTION

Each preferred embodiment of the present invention will be described in detail with reference to the accompanying figures.

The present invention discloses a distributed file system and a CHUNK consistency managing method, in which the concept of CHUNK counter is put forward, each CHUNK is provided with a counter to indicate the times that the CHUNK is revised. The counter value is increased with a predetermined step length at each time of revising the CHUNK, therefore, if the counter values of the main and standby CHUNK are not consistent, it means that there is invalid CHUNK, and the abnormal CHUNKs are correspondingly reconstructed.

The method of the present invention solves the problem of managing the main and standby CHUNKs, and the main implementation comprises:

When generating the CHUNKs, the CHUNKs are uniformly generated by the FLR, and the counter value of the firstly constructed CHUNK is 1. This value is also stored in the FAS and the FLR.

Figure 1:
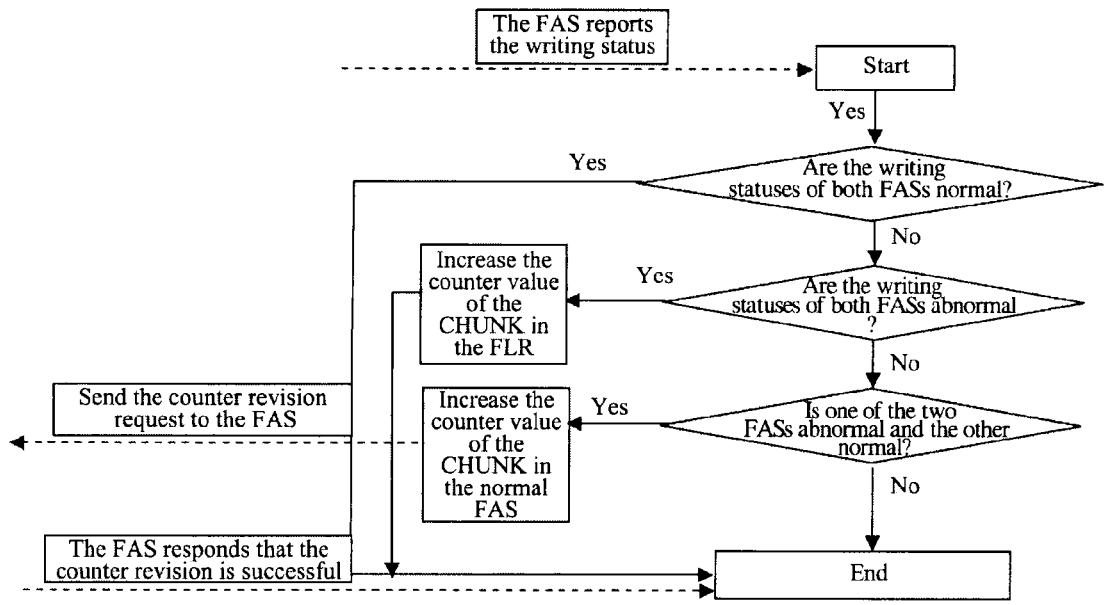
FIG. 1 is a flow chart of revising the value of the CHUNK counter when using the method of the present invention to write or revise the data.

In the process of a user initiating the process of writing CHUNK data, for the sake of intuition, the embodiment of the present invention will take the case that there is one main and one standby FASs for example for illustration, as shown in FIG. 1, the FAC simultaneously writes two copies of data to the main and standby FASs respectively, and if the data writing to both the main and standby FASs are successful, the process of CHUNK counter revision is not initiated. If abnormality occurs in writing data to a certain FAS, the FAC initiates the process of counter revision to the normal FAS to revise the current counter value of the normal CHUNK, therefore, the counter values of the CHUNKs in the main and standby FASs are not consistent, and the counter value of the normal CHUNK is larger. At a later stage, the abnormal CHUNK can be determined with simple check, and also this CHUNK is reconstructed in the abnormal FAS.

When a user initiates revision for the file content, the FLR returns the information of the two FASs in which the corresponding CHUNK locates to the FAC, and the FAC directly initiates the data revision operation to the two FASs. If both the main and standby FASs successfully revise the data, do not initiate the process of revising the CHUNK counter. If abnormality occurs in writing data to a certain FAS, the FAC initiates a process of CHUNK counter revision to the normal FAS to make the counter value of the corresponding CHUNK in said FAS with a predetermined step length and increases the counter value of the CHUNK in the FLR simultaneously, thus the counter values of the CHUNKs in the main and standby FASs are not consistent. By comparing the counter values, the abnormal CHUNK can be determined with simple check at a later stage, and the CHUNK is reconstructed in the abnormal FAS.

With the above-mentioned process, it can guarantee that when there is abnormal, the counter values of the CHUNKs in the main and standby FASs are not consistent certainly. The FLR initiates the CHUNK check request to the FAS at the start-up time point and at a certain time interval. According to the counter values of the CHUNKs reported by the main and standby FASs, the FLR can determine the FAS in which CHUNK is valid with the maximum counter value as basis for determination, thus the CHUNKs in the abnormal FAS can be reconstructed.

In the following, the CHUNK consistency managing method in the distributed file system in the present invention will be illustrated with examples:

Define the CHUNKID as: FILDID (4 byte unsigned integers)+CHUNK numbering (2 byte unsigned integers)+counter (4 byte unsigned integers); there is a database in the FLR side to store each CHUNKID, which comprises the counter value of the CHUNK and the location information of the FAS in which said CHUNK locates; each CHUNK is managed and the counter value of the CHUNK is recorded in the FAS side.

As shown in FIG. 1, when a user initiates a writing process, the FAC firstly applies to allocate all FASs which have backup relationship to the FLR. After the allocation succeeds, the FLR writes the CHUNKID into the local database, and the initial value of the CHUNK counter is set as 1.

The FAC directly sends a data writing request to the two FASs. When the FAC is writing the data, it continuously reports the writing status of each FAS. The reported status information comprises: the currently being written CHUNK ID and the writing status of each FAS.

After the FLR receives the reported statuses, it compares the writing statuses of the two FASs, and if they are all normal, no processing is needed; if both FASs are abnormal, directly increase the counter values of the CHUNKs in the FLR; if the writing status of one FAS is found abnormal at a time point, while the other is normal, the FLR will initiate CHUNK counter revision request to the normal FAS. After said normal FAS receives the request, it increases the counter value corresponding to the local CHUNK and returns the revision success message to the FLR. After the FLR receives the revision success message, it revises the value in the local database as the one in the normal FAS, while the CHUNK counter value reported by the abnormal FAS will not be revised.

When a user initiates a revision, the processing procedure is similar to the above process. The difference is that, when new data is written, what the FLR returns is the information of the FAS in which the new CHUNK locates or the information of the FAS which already has data.

Figure 2:
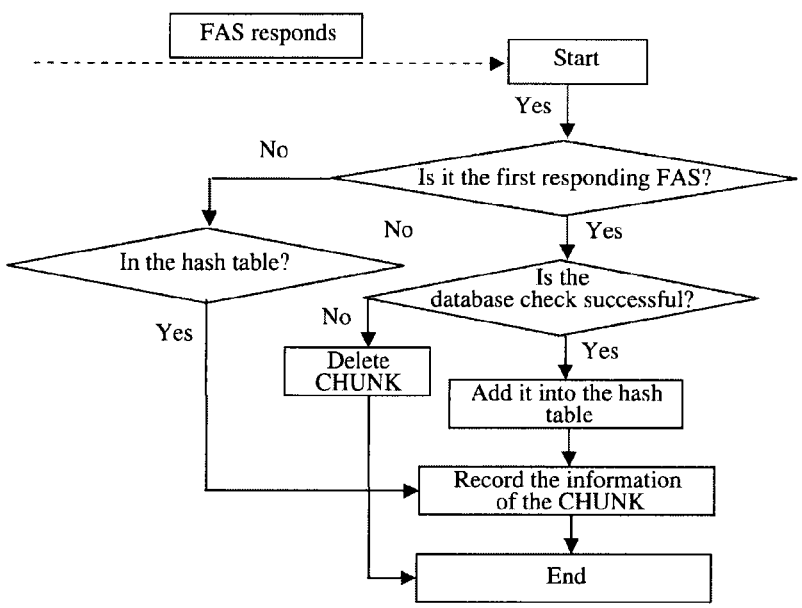
FIG. 2 is a flow chart of the FLR receiving and checking the CHUNKs reported by the FAS in accordance with a method of the present invention.

The FLR initiates the CHUNK check request process to the FAS at the start-up time point and at a certain interval, as shown in FIG. 2, the check method is: the FLR takes each main and standby FASs as a pair, and the overall cluster CHUNKs are divided into several pairs such as N pairs. For each pair, the check request is sent to each member of the pair, the FAS who has received the requested reports all local CHUNKIDs to the FLR, and the FLR makes the first received CHUNKID information into a HASH table, and searches in the HASH table upon receiving subsequent CHUNKID, and if it finds the CHUNKID in the table, it means that they are a pair of main and standby CHUNKs.

Figure 3:
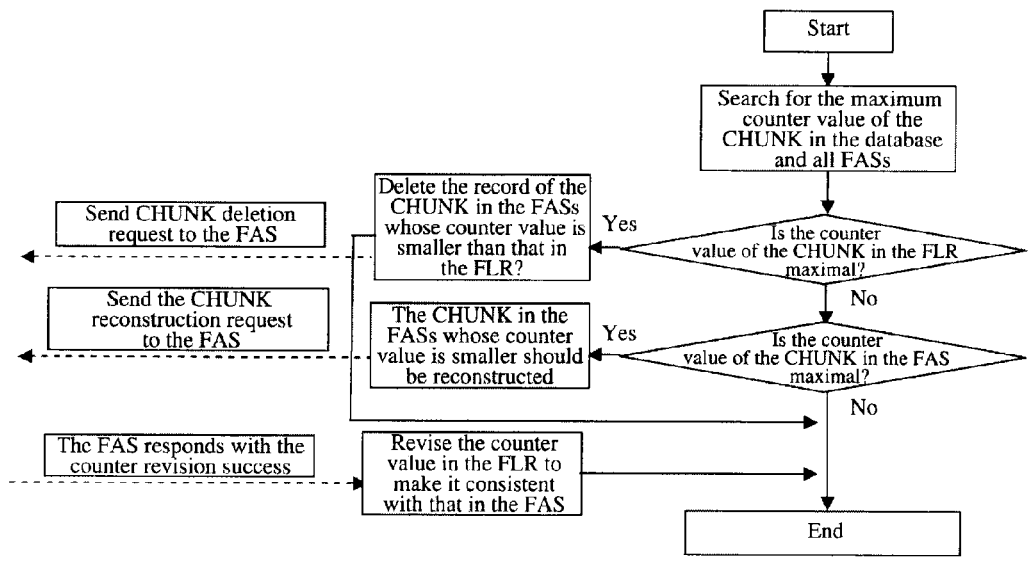
FIG. 3 is a flow chart of the specific check method by the FLR in accordance with the method of the present invention.

If it does not find the received CHUNKID in the HASH table, it might be because that the main and standby CHUNKID are not complete; record all pairs of CHUNKID information at the same time, and after a pair of members are checked successfully, the FLR checks the information of each CHUNKID, and the check process is shown in FIG. 3, and the process comprises:

Step one: check whether there is record of the CHUNK in the FLR or not; and directly delete the CHUNK if no, otherwise, pass the check;

Step two: calculate the counter value of the CHUNK in the FLR database and each FAS, compare them to get the maximum one and take the CHUNK with the maximal counter value as the valid and normal one.

Step three: check the counter value of the CHUNK, and the specific process comprises:

If the counter value of the CHUNK in the FLR is maximal, it means that the data of the CHUNK in all FASs is not reliable, and it needs to delete the record of the CHUNK in the FLR database.

If there is FAS who has the maximal counter value of the CHUNK, the FLR initiates the CHUNK reconstruction request to all FASs in which the CHUNK has smaller counter value, that is, informs the FAS in which the counter value is maximal that a certain CHUNK therein has to be copied from the local to the abnormal FASs. After the copy completes, the counter value of the corresponding CHUNK in each FAS is revised immediately to make it consistent with the maximal value.

If the counter value of the CHUNK in the FLR is smaller than that in the FASs, it needs to simultaneously revise the counter value of the CHUNK in the FLR database.

Figure 4:
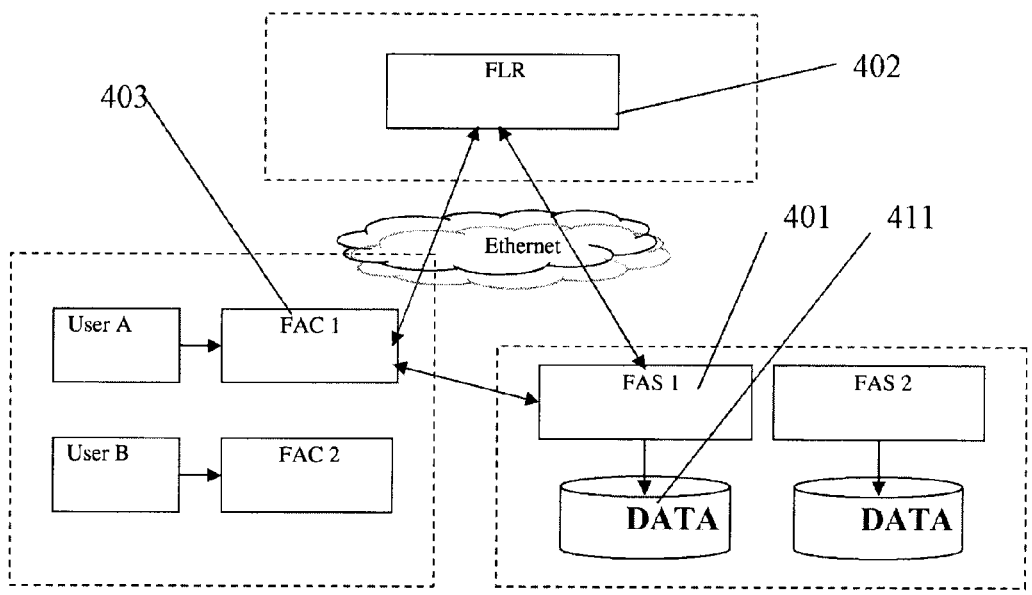
FIG. 4 illustrates the structure of the distributed file system in accordance with the present invention.

FIG. 4 shows the structure of the distributed file system in accordance with the present invention, and the system comprises at least one file access server 401 and at least one file location register 402 which are connected together through a network such as the Ethernet, wherein, each file access server 401 also connects with a corresponding data storage 411, at least one file location register 402 is used to generate the counter value of the corresponding CHUNK in the data writing operation for the file access server 401. The user sends the data access request to the corresponding file access server 401 and the file location register 402 via said file access client 403; said file access server 401 is configured with at least the main and standby file access servers, and said file access client 403 is used to write data into the corresponding CHUNK in said main and standby file access servers, and increase the counter value of the CHUNK in the file access server into which data writing is normal with the predetermined step length; said file location register 402 is used to judge whether the CHUNK is abnormal or not according to whether the counter values of the corresponding CHUNKs reported by the main and standby file access servers are consistent or not and also used to control the reconstruction of the abnormal CHUNKs.

The distributed file system and the CHUNK consistency managing method in accordance with the present invention could easily and effectively manage the redundant standby CHUNKs in the massive cluster system to maintain their consistency, and reconstruct the abnormal standby CHUNKs. It mainly represents that:

1. in the process of a user storing (additively writing or revising) the data, if one party of the main and standby FASs is abnormal, increase the counter value of the CHUNK in the normal FAS while maintain the counter value of the CHUNK in the abnormal FAS; when the FLR performs the timing checks later, it deletes the CHUNKs in the FAS whose counter value is smaller according to the check of the counter value of the CHUNK, and reconstructs the corresponding CHUNKs in the abnormal FAS based on the CHUNKs in the normal FAS.

2. The method of the present invention takes the CHUNK whose counter value is maximal as the normal and valid one, and if the value recorded in the FLR is maximal, it means that the CHUNKs in all FASs are not reliable; if the value recorded in one FAS is maximal, it needs to reconstruct this CHUNK to the other FASs whose value is smaller and revise the record in the FLR meanwhile.

From the above description, it can be seen that the distributed file system and the CHUNK consistency managing method in accordance with the present invention can be easily and accurately implemented; the check and calculation are very fast and are suitable to process massive CHUNKs.

It should be understood that the description of the preferred embodiments of the present invention is relatively specific and should not be considered to restrict the scope of the present invention, and the scope of the present invention is defined by the accompanying claims.

INDUSTRIAL APPLICABILITY

The distributed file system and the CHUNK consistency managing method provided in the present invention applies the CHUNK counter to record whether a CHUNK is abnormal or whether a CHUNK needs to be reconstructed or not, and in the massive cluster system, the system and the method can easily and effectively manage the redundant standby CHUNKs and maintain their consistency, moreover, they can reconstruct the abnormal standby CHUNKs, and the implementation is simple and accurate.

We claim:

1. A CHUNK consistency managing method in a distributed file system, and said method comprising the following steps of:
   A. when generating a CHUNK, a file location register generating a counter value corresponding to the generated CHUNK and storing the counter value in both file access servers and the file location register;
   B. when writing data into a CHUNK, a file access client writing the data into a main and standby file access servers, and if the data is successfully written into both the main and standby file access servers, the counter value of the CHUNK into which the data is written is maintained unchanged; otherwise, the file access client increasing the counter value of the CHUNK into which the data is written in the file access servers into which the data is written successfully with a predetermined step length;
   C. said file location register, based on the current counter values of the CHUNK reported by the main and standby file access servers respectively, taking the CHUNK in a file access server whose counter value is maximal as a normal and valid CHUNK, and taking the CHUNKs in other file access servers as abnormal CHUNKs and reconstructing the abnormal CHUNKs.

2. A method of claim 1, said method further comprising:
   when revising data of the CHUNK, said file location register returning to said file access client information of the main and standby file access servers in which the CHUNK required to be revised locates, and said file access client initiating a data revision operation for said main and standby file access servers;
   if the data revision operation for both said main and standby file access servers is successful, the counter value of the revised CHUNK is maintained unchanged; otherwise the file access client increasing with the predetermined step length the counter value of the revised CHUNK in the file access server for which data revision operation is successful.

3. A method of claim 2, wherein, said predetermined step length is 1.

4. A method of claim 3, wherein, said step C further comprises:
   said file location register sending a CHUNK check request to said file access servers at a start-up time point and at a certain time interval.

5. A method of claim 4, said method further comprising a CHUNK check process, wherein the CHUNK check process comprises:
   D1. said file access servers reporting all local CHUNKIDs to the file location register, and said file location register making a HASH table with the CHUNKIDs received firstly, and for a CHUNKID received subsequently, searching in the HASH table for a CHUNKID matched with the CHUNKID received subsequently, and if there is a CHUNKID matched with the CHUNKID received subsequently in the HASH table, taking CHUNKs corresponding to the CHUNKIDs matched with each other as a group of main and standby CHUNKs;
   D2. the file location register recording all groups of CHUNKIDs, and checking CHUNKs corresponding to each group of CHUNKIDs.

6. A method of claim 5, wherein,
   said file location register takes the main and standby file access servers storing copies of the same CHUNK as one group and divides all file access servers in the system into a plurality of groups.

7. A method of claim 5, wherein, said step of checking the CHUNKs corresponding to each group of CHUNKIDs in step D2 comprises:
   D21. checking whether the CHUNKs being checked have record in said file location register or not; and directly deleting the CHUNKs being checked from the file access servers if no; otherwise proceeding to step D22;
   D22. comparing the counter values of the CHUNKs being checked in said file location register and each file access server, and taking the CHUNK with the maximum counter value as a valid CHUNK.

8. A method of claim 7, wherein,
   if the counter value of the CHUNK being checked in said file location register is maximal, a record of the CHUNK in a database of said file location register is deleted.

9. A method of claim 7, wherein,
   if there is a file access server in which the counter value of the CHUNK being checked is maximal, said file location register sends a CHUNK reconstruction request to other file access servers in which the counter value of the CHUNK is relatively small and copies the CHUNK in the file access server with the maximal counter value to the file access server with the relatively small counter value;
   after the CHUNK is copied, the counter value of the CHUNK being checked in each file access server is revised to make the counter value consistent with the maximum counter value.

10. A method of claim 7, wherein,
    if the counter value of the CHUNK being checked in said file location register is smaller than that in said file access servers, a counter value of the CHUNK being checked in a database of the file location register is revised synchronously.

11. A distributed file system, said system comprising at least one file access server and at least one file location register connected together through a network; said file access server connecting to a data storage; a user sending a data writing request to said file access server and said file location register via a file access client and increasing counter value of a CHUNK in the file access server to which data is written normally with a predetermined step length; wherein, said file access server is configured with at least a main and standby file access servers; and
    said file location register is configured to generate the counter value corresponding to the CHUNK, and control reconstruction for abnormal CHUNKs according to the counter value of the CHUNK reported by the main and standby file access servers.

* * * * *